(12) United States Patent
Bai et al.

(10) Patent No.: US 12,301,330 B2
(45) Date of Patent: May 13, 2025

(54) UPLINK BEAM FAILURE REPORT FOR A DEFAULT UPLINK BEAM

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 17/098,264

(22) Filed: Nov. 13, 2020

(65) Prior Publication Data
US 2021/0242925 A1 Aug. 5, 2021

Related U.S. Application Data

(60) Provisional application No. 62/968,773, filed on Jan. 31, 2020.

(51) Int. Cl.
| | |
|---|---|
| H04B 7/08 | (2006.01) |
| H04B 7/06 | (2006.01) |
| H04W 52/36 | (2009.01) |
| H04W 72/53 | (2023.01) |
| H04W 76/11 | (2018.01) |
| H04W 76/19 | (2018.01) |

(52) U.S. Cl.
CPC ........... *H04B 7/088* (2013.01); *H04B 7/0695* (2013.01); *H04W 52/365* (2013.01); *H04W 72/53* (2023.01); *H04W 76/11* (2018.02); *H04W 76/19* (2018.02)

(58) Field of Classification Search
CPC . H04B 7/088; H04B 7/0695; H04W 72/0493; H04W 76/11; H04W 76/19; H04W 16/28; H04W 52/365
See application file for complete search history.

(56) References Cited

U.S. PATENT DOCUMENTS

| | | | |
|---|---|---|---|
| 11,510,239 B2* | 11/2022 | Cirik | ..................... H04L 5/0053 |
| 2013/0114454 A1 | 5/2013 | Hwang et al. | |

(Continued)

FOREIGN PATENT DOCUMENTS

| | | | | |
|---|---|---|---|---|
| CN | 110637496 A | 12/2019 | | |
| WO | WO2018171044 | * | 5/2017 | ............... H04B 7/04 |

(Continued)

OTHER PUBLICATIONS

International Search Report and Written Opinion—PCT/US2021/012976—ISA/EPO—May 3, 2021.

(Continued)

*Primary Examiner* — Raj Jain
(74) *Attorney, Agent, or Firm* — Procopio, Cory, Hargreaves & Savitch LLP

(57) ABSTRACT

A user equipment (UE) determines a beam failure of a default uplink beam for the UE. The UE transmits an uplink beam failure report in response to determining the beam failure of the default uplink beam, the uplink beam failure report indicating that a reported beam is the default uplink beam for the UE. A base station receives an uplink beam failure report from the UE and determines that a reported beam is a default uplink beam for the UE.

26 Claims, 10 Drawing Sheets

(56) References Cited

U.S. PATENT DOCUMENTS

| | | | |
|---|---|---|---|
| 2018/0302889 A1* | 10/2018 | Guo | H04W 72/046 |
| 2019/0058519 A1* | 2/2019 | Davydov | H04W 72/21 |
| 2019/0068268 A1* | 2/2019 | Zhang | H04B 7/0626 |
| 2019/0182682 A1* | 6/2019 | Kim | H04W 74/08 |
| 2019/0190582 A1* | 6/2019 | Guo | H04B 17/17 |
| 2019/0215877 A1 | 7/2019 | Qian et al. | |
| 2019/0230730 A1* | 7/2019 | Wang | H04W 74/0833 |
| 2019/0239212 A1* | 8/2019 | Wang | H04L 5/0051 |
| 2019/0268893 A1* | 8/2019 | Tsai | H04W 74/0833 |
| 2019/0268961 A1* | 8/2019 | Tsai | H04W 76/19 |
| 2019/0297640 A1* | 9/2019 | Liou | H04L 5/001 |
| 2019/0305840 A1* | 10/2019 | Cirik | H04W 74/006 |
| 2019/0306850 A1 | 10/2019 | Zhang et al. | |
| 2020/0145080 A1* | 5/2020 | Tang | H04B 7/088 |
| 2020/0288479 A1* | 9/2020 | Xi | H04W 72/046 |
| 2020/0314860 A1* | 10/2020 | Zhou | H04W 72/23 |
| 2021/0021325 A1* | 1/2021 | Davydov | H04W 76/19 |
| 2021/0044343 A1* | 2/2021 | Onggosanusi | H04B 7/063 |
| 2021/0051565 A1* | 2/2021 | Akkarakaran | H04W 40/246 |
| 2021/0175919 A1* | 6/2021 | Badic | H04B 7/0408 |
| 2021/0185647 A1* | 6/2021 | Rahman | H04L 5/0091 |
| 2021/0242925 A1* | 8/2021 | Bai | H04B 7/088 |
| 2022/0322247 A1* | 10/2022 | Sun | H04W 52/42 |
| 2023/0043225 A1* | 2/2023 | Hong | H04W 52/365 |

FOREIGN PATENT DOCUMENTS

| | | | | |
|---|---|---|---|---|
| WO | WO2018171044 A1 * | 5/2017 | | |
| WO | WO-2021142432 A1 * | 1/2020 | | H04W 52/24 |
| WO | WO2021142432 * | 1/2021 | | H04L 5/0023 |
| WO | WO2021242432 A * | 1/2021 | | |

OTHER PUBLICATIONS

Qualcomm Incorporated: "Enhancements on Multi-Beam Operation", 3GPP Draft, 3GPP TSG-RAN WG1 Meeting #98, R1-1909273, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Prague, Czech, Aug. 26, 2019-Aug. 30, 2019, Aug. 17, 2019 (Aug. 17, 2019), XP051765878, 19 Pages, Retrieved from Internet: URL: http://www.3gpp.org/ftp/tsg_ran/WG1_RL1/TSGR1_98/Docs/R1-1909273.zip [retrieved on Aug. 17, 2019] Section 7.4.

CATT: "Remaining issues on beam management enhancements in Rel 16", 3GPP TSG RAN WG1 #98bis, R1-1910350, Chongqing, China, Oct. 13-20, 2019, Oct. 5, 2019, 9 Pages.

* cited by examiner

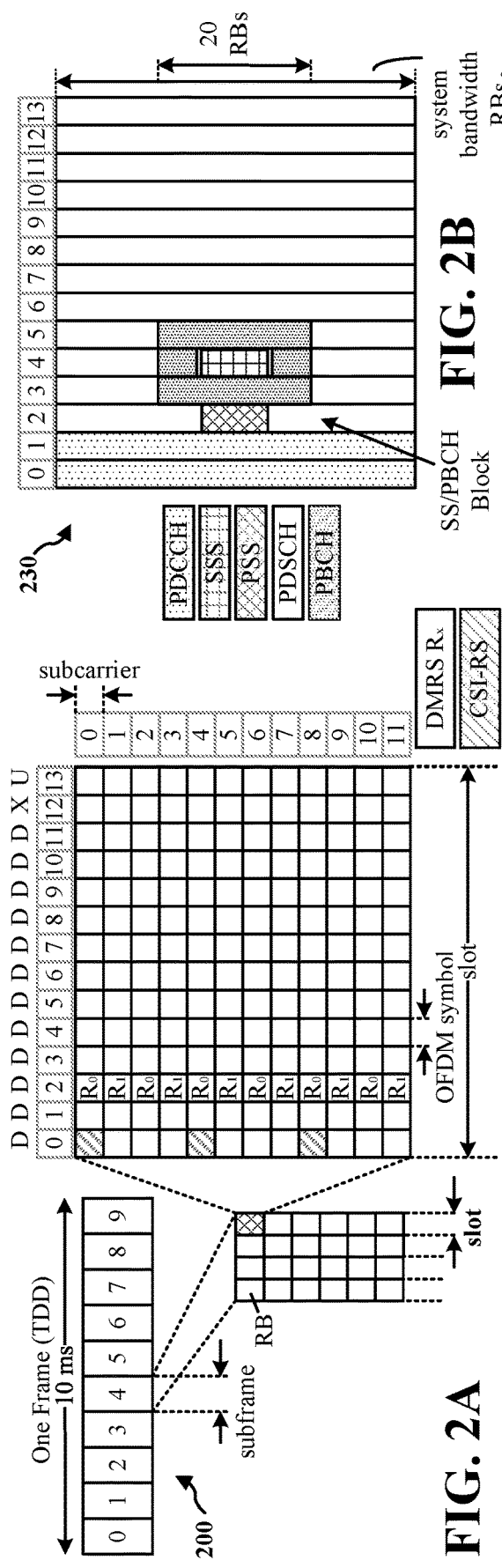
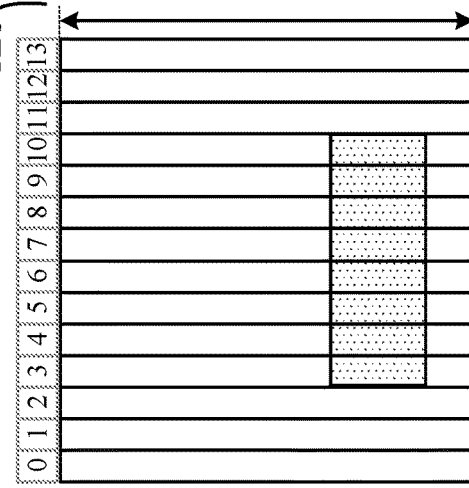
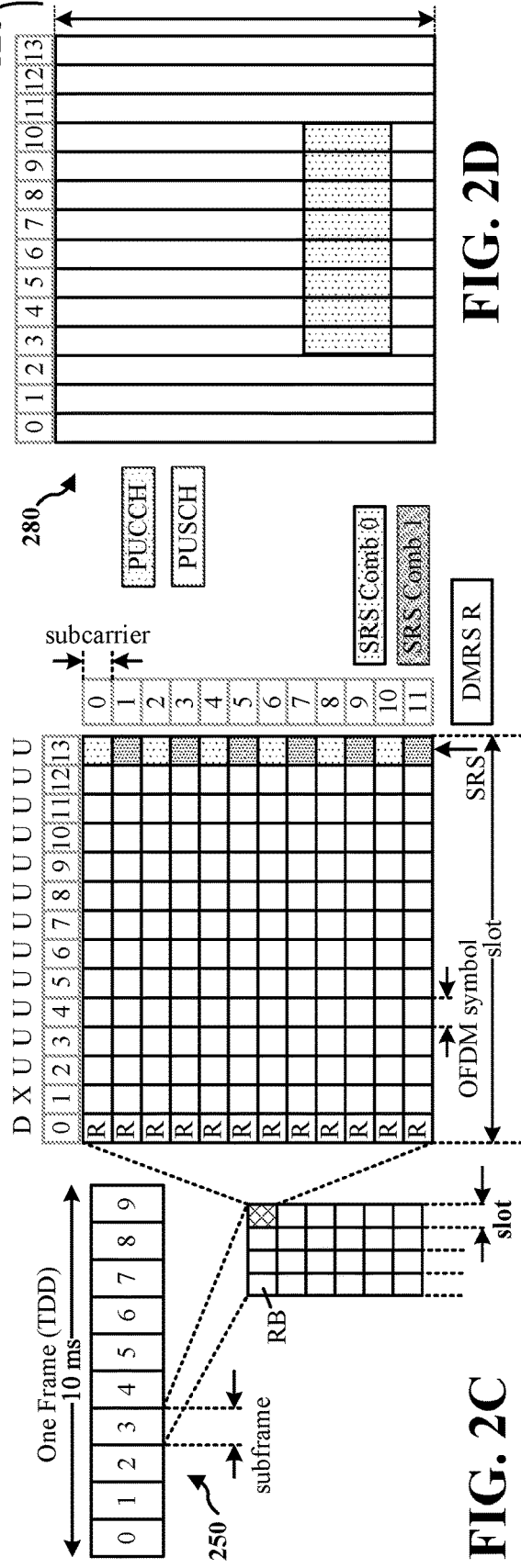

UPLINK BEAM FAILURE REPORT FOR A DEFAULT UPLINK BEAM

CROSS REFERENCE TO RELATED APPLICATION

This application claims the benefit of U.S. Provisional Application Ser. No. 62/968,773, entitled "Uplink Beam Failure Report for a Default Uplink Beam" and filed on Jan. 31, 2020, which is expressly incorporated by reference herein in its entirety.

BACKGROUND

Technical Field

The present disclosure relates generally to communication systems, and more particularly, to wireless communication using directional beams.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus determines a beam failure of a default uplink beam for the UE. The apparatus transmits an uplink beam failure report in response to determining the beam failure of the default uplink beam, the uplink beam failure report indicating that a reported beam is the default uplink beam for the UE.

In an aspect of the disclosure, a method, a computer-readable medium, and an apparatus are provided for wireless communication at a base station. The apparatus receives an uplink beam failure report from the UE. Then, the apparatus determines that a reported beam is a default uplink beam for the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
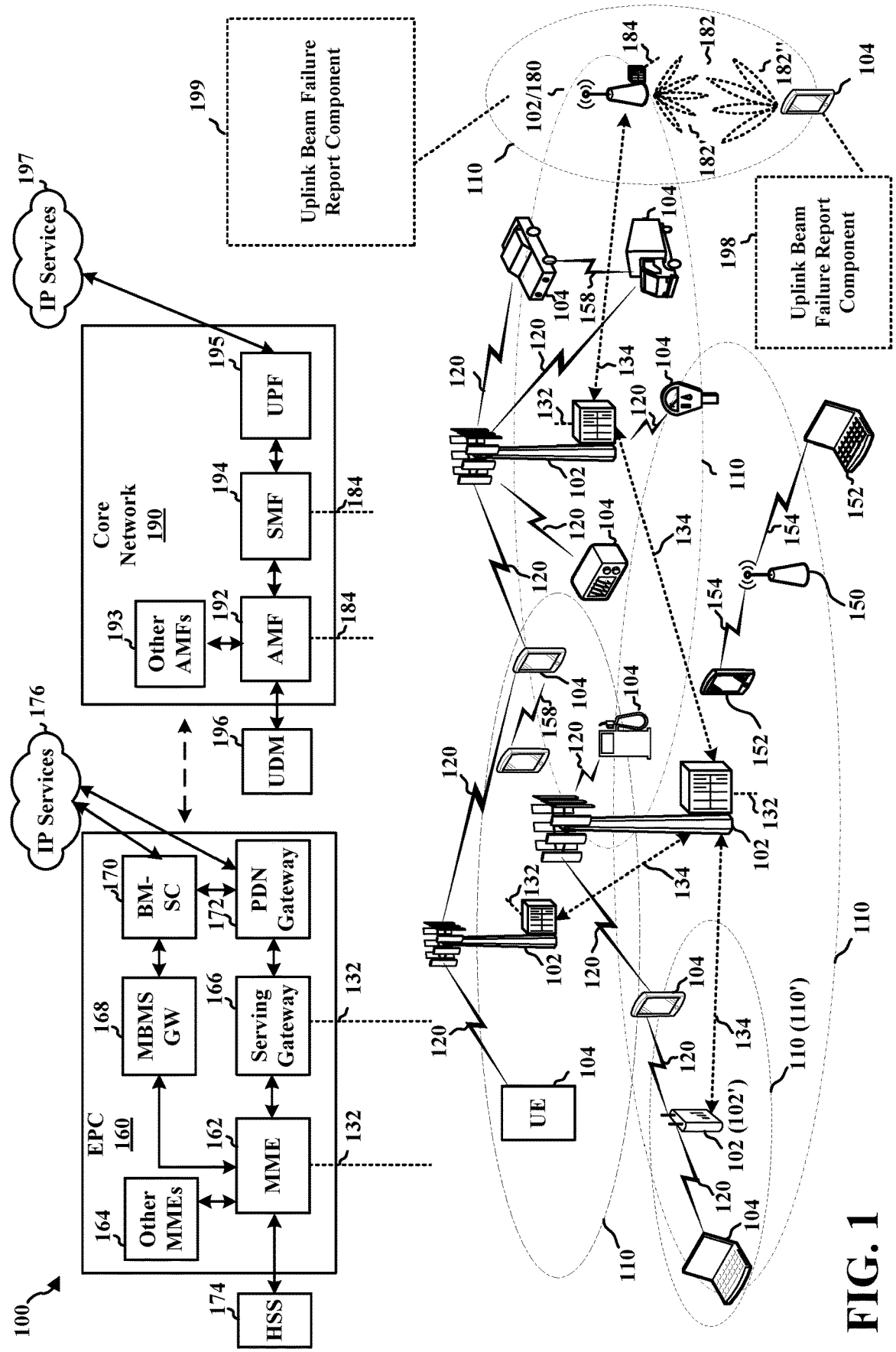
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A UE, such as a millimeter wave (mmW) UE, may use beamforming to improve wireless communication with a base station. Directional beamforming concentrates a transmission power in a reduced angular domain around an intended transmission direction. As conditions change, an uplink beam that previously had a good quality may experience a beam failure. Among other examples, a beam failure may be based on a reduction in uplink transmission power in response to a maximum permissible exposure (MPE) level that provides a highest energy density that can be exposed to or near a human body. The UE may report the beam failure to the base station, and the base station may respond to the beam failure by selecting a new uplink beam for the UE.

The UE may use a default beam for uplink transmissions without a configured spatial relation, such as a physical uplink control channel (PUCCH), a sounding reference signal (SRS), or a physical uplink shared channel (PUSCH). If the beam that experiences a beam failure is a default uplink beam, the beam does not have a configured spatial relation. The base station may not be able to determine that the default uplink beam has experienced a beam failure.

Aspects presented herein enable a UE to indicate a default beam in a beam failure report to the base station and for the base station to interpret the beam failure report in order to identify the reported beam as a default uplink beam for the UE. In some examples, the UE may report a beam failure of a default uplink beam using a reserved uplink beam indication ID that is associated with a default uplink beam. The reserved ID may be beyond a maximum configured ID for spatial relation information or an uplink TCI state. The reserved ID may have a particular set of bits, e.g., all 1s. In some examples, the default uplink beam may be based on a control resource set (CORESET), and the UE may indicate the default uplink beam based on an ID associated with the CORESET. In some examples, the default uplink beam may be indicated by one or more dedicated bits in the beam failure report. In some examples, the UE may indicate the default uplink beam through the absence of an uplink beam ID in a beam failure report.

FIG. 1 is a diagram illustrating an example of a wireless communications system and an access network 100 including base stations 102 and 180 and UEs 104. In some aspects, the UE 104 may determine a beam failure of a default uplink beam for the UE 104. The UE 104 may include an uplink beam failure report component 198 configured to transmit an uplink beam failure report in response to determining the beam failure of the default uplink beam, the uplink beam failure report indicating that a reported beam is the default uplink beam for the UE. The base station 102, 180 may include an uplink beam failure report component 199 that receives an uplink beam failure report from a UE and determines that a reported beam is a default uplink beam for the UE. Although the following description may be focused on 5G NR, the concepts described herein may be applicable to other similar areas, such as LTE, LTE-A, CDMA, GSM, and other wireless technologies. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHZ" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2^\mu$ slots/subframe. The subcarrier spacing and symbol length/duration are a function of the numerology. The subcarrier spacing may be equal to $2^\mu *15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
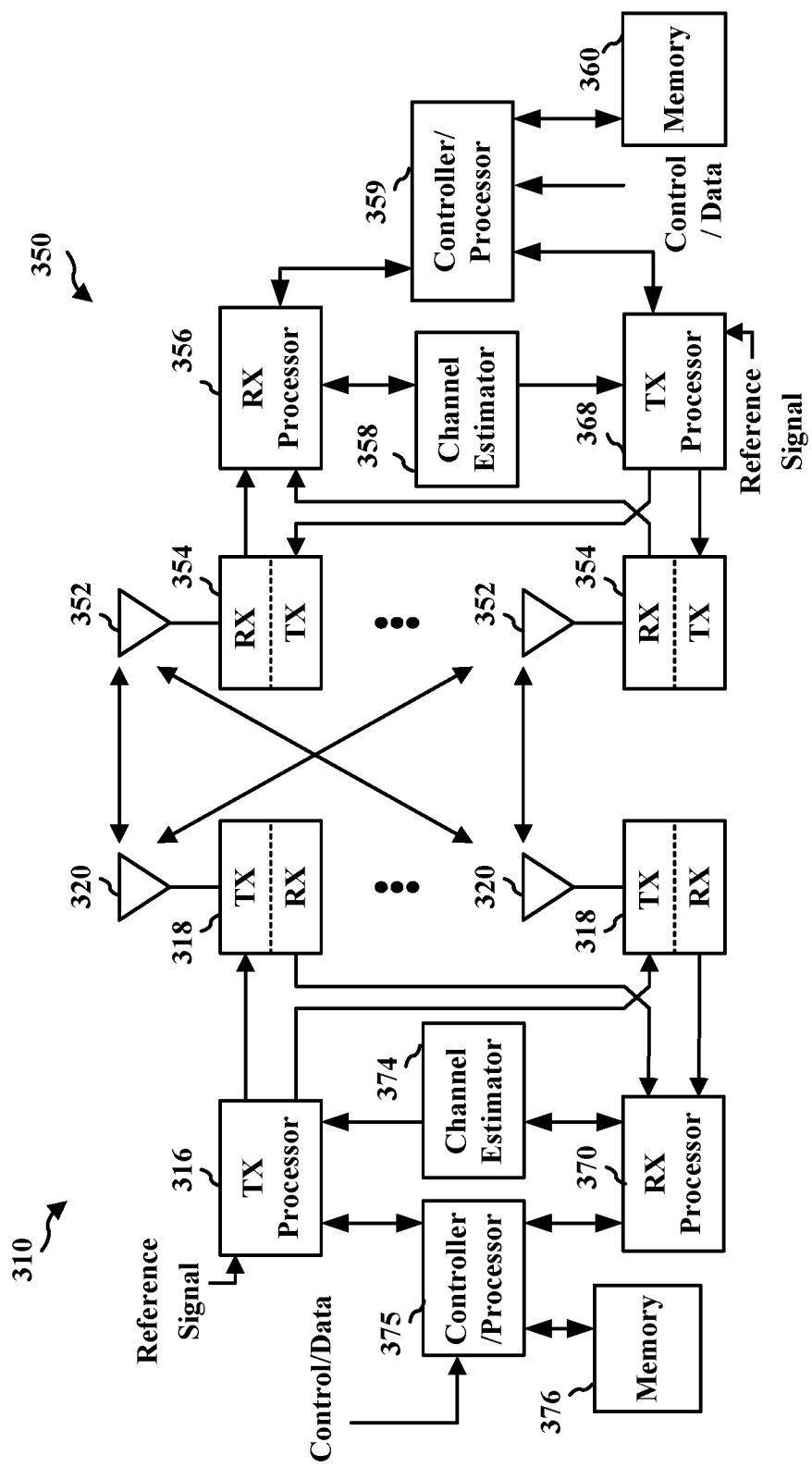
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

As described in connection with FIG. 1, a base station 102 or 180 may operate in millimeter wave (mmW) frequencies, and/or near mmW frequencies to communicate with a UE 104. Communications using the mmW/near mmW radio frequency (RF) band (e.g., 3 GHZ-300 GHz) may experience higher path loss and a shorter range than wireless communication at other frequencies. The base station and UE may utilize beamforming, e.g., as illustrated at 182 in FIG. 1, with the UE 104 to compensate for the path loss and short range. Similarly, a mmW UE may use perform directional beamforming to boost power of uplink transmissions to the base station.

The base station 180 or the UE 104 may perform beam training to determine the best receive and transmit directions, e.g., downlink beams and uplink beams, for each of the base station 180 or the UE 104. The transmit and receive directions, e.g., downlink beams and uplink beams, for the base station 180 may or may not be the same. The transmit and receive directions, e.g., downlink beams and uplink beams, for the UE 104 may or may not be the same.

Figure 4:
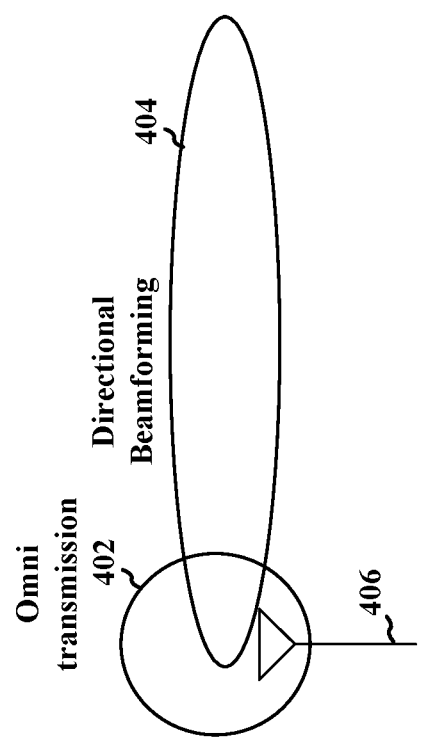
FIG. 4 illustrates an example omni transmission and a beamformed transmission.

FIG. 4 illustrates an example transmission pattern 402 or shape for an antenna 406 transmitting using an omni transmission and an example beam 404 for the antenna 406 transmitting using a directional beam. The base station 180 and the UE 104 may each include a plurality of antennas, such as antenna elements, antenna panels, and/or antenna arrays to facilitate the beamforming. Directional beamforming concentrates a transmission power in a small angular domain around the intended transmission direction. Output energy (e.g. in terms of Equivalent Isotropically Radiated Power (EIRP)) in the angle of the beamformed transmission 404 can be potentially higher than for an omni transmission such as 402.

A maximum permissible exposure (MPE) level provides a highest energy density that can be exposed to or near a human body. The MPE value may be defined by standards or regulations. The MPE restrictions may limit some operation for a wireless device, e.g., placing limits on uplink transmission for a UE. The MPE restrictions may be more stringent for a mmW band (e.g., 30-300 GHz) as the electromagnetic wave in the mmW band may cause various human body resonances.

The MPE may be based on a consideration of the exposure to a human body near the transmission antenna, such as a user's fingers or hands that may be placed near the transmission antenna while a user holds the wireless device, e.g., rather than other objects that may be near the phone. Therefore, a mmW device may have components to detect whether a part of a human body is within a range of a transmitter. The mmW device may use a radar, a sensor, etc. to detect the presence of a body part near transmission antenna(s). When a body part is detected within a range of the transmitter, the wireless device may reduce a transmission power of the affected antenna(s) in order to meet the MPE limit. An uplink transmission on an uplink beam that had a good quality prior to a reduction in transmission power may not be usable to communicate with a base station following the reduction in the transmission power. The uplink beam may experience a beam failure following the reduction of the transmission power. The base station may respond to the beam failure by selecting a new uplink beam for the UE. MPE is only one example factor that may lead to a beam failure for an uplink beam. The aspects presented herein may be applied to report a beam failure of a default uplink beam due to other reasons than a reduced transmission power based on an MPE level.

Figure 5:
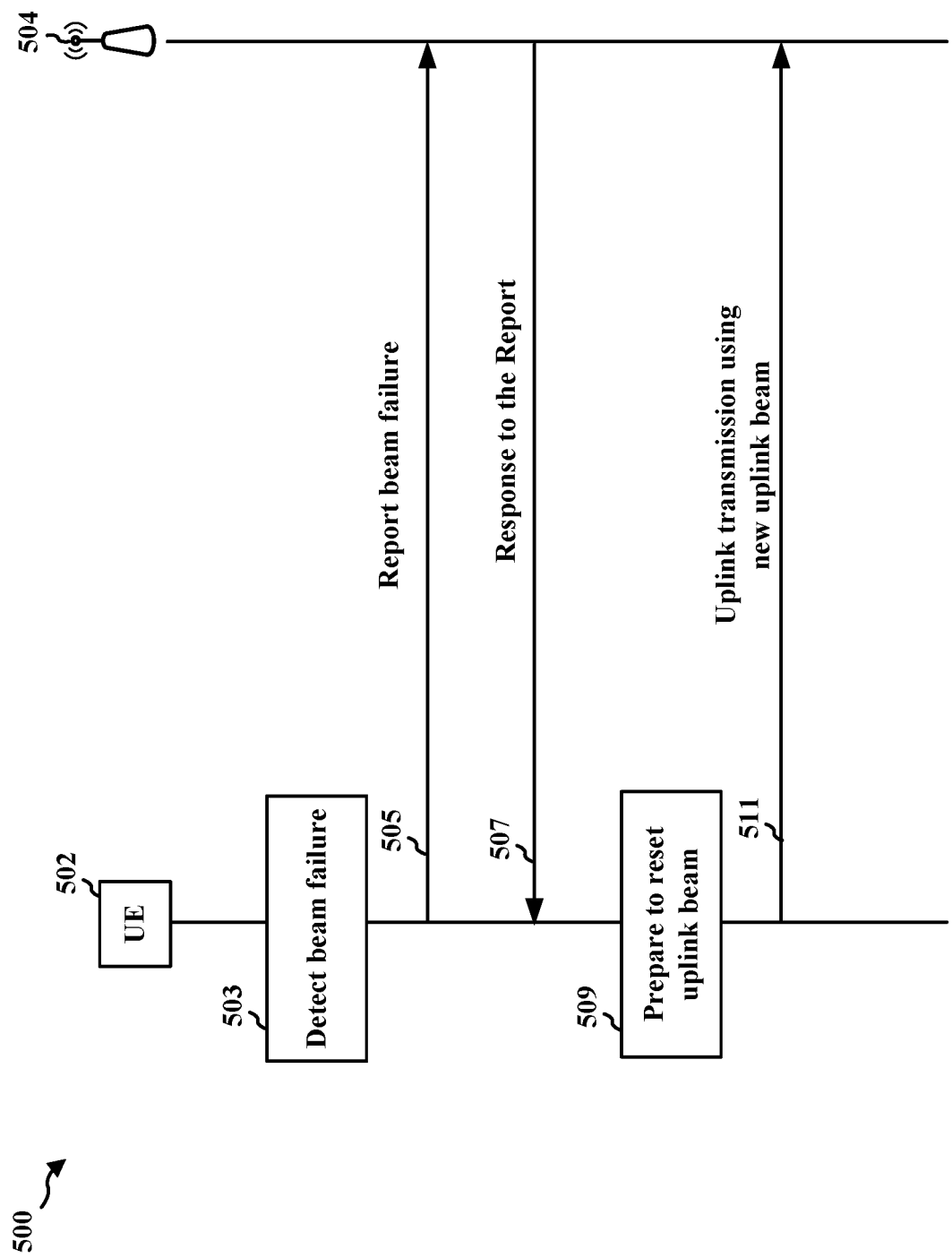
FIG. 5 is an example communication flow between a UE and a base station.

FIG. 5 illustrates an example communication flow 500 between a UE 502 and a base station 504 that includes an event driven report of an MPE event. At 503, the UE 502 detects a beam failure, such as an MPE event, for an uplink beam, which triggers a report to the base station 504. An MPE event is one example that may lead to a beam failure of the uplink beam, and other circumstances may also lead to a beam failure. The UE 502 may monitor the quality of the beams (e.g., beams 182") that the UE 502 uses for communication with the base station 504. For example, the UE 502 may monitor a quality of a signal received via reception beam(s). In another example, the UE 502 may use a downlink signal to measure path loss and may use a sensor/radar to determine whether a body part is near a transmission antenna. If a body part is detected near a transmission antenna, the UE may backoff, or reduce, a transmission power to meet an MPE limit. The UE may use the uplink transmission power and the path loss determined from the downlink signal to determine an uplink RSRP for a signal received at the base station. The UE may compare the determined uplink RSRP with a threshold to determine whether a beam failure occurs for the uplink beam. For example, if the uplink RSRP is below a threshold, the UE may detect a beam failure for the uplink beam. A Beam Failure Detection (BFD) procedure may be used to identify problems in beam quality and a Beam failure recovery (BRF) procedure may be used when a beam failure is detected. For monitoring active link performances, the UE 502 may perform measurements of at least one signal, e.g., reference signals, for beam failure detection. The measurements may include deriving a metric similar to a Signal to Interference plus Noise Ratio (SINR) for the signal, or RSRP strength or block error rate (BLER) of a reference control channel chosen by base station and/or implicitly derived by UE based on the existing RRC configuration. The reference signal may comprise any of CSI-RS, Physical Broadcast Channel (PBCH), a synchronization signal, or other reference signals for time and/or frequency tracking, etc. In some cases, the UE 502 may determine a configured metric such as block error rate (BLER) for a reference signal. The measurement(s) may indicate the UE's ability to transmit an uplink transmission to the base station 504 using the beam.

Thresholds may be defined in tracking the radio link conditions, the threshold(s) may correspond to an RSRP, a BLER, etc. that indicates an in-sync condition and/or an out-of-sync condition of the radio link. An "out-of-sync" condition may indicate that the radio link condition is poor, and an "in-sync" condition may indicate that the radio link condition is acceptable, and the base station 504 is likely to receive a transmission transmitted on the radio link. An Out-of-Sync condition may be declared when a block error rate for the radio link falls below a threshold over a specified time interval. An in-sync condition may be declared when a block error rate for the radio link is better than a threshold over a specified time interval. If the UE 502 receives a threshold number of consecutive out-of-sync measurements over a period of time, the UE 502 may report a beam failure to the base station 504.

When a beam failure is detected, the UE 502 may take appropriate actions to recover the connection with the base station 504. For example, after multiple out-of-sync measurements, the UE 502 may transmit a beam failure recovery signal to the base station 504 to initiate recovery of the connection with the base station 504. For example, the base station 504 may configured the UE 502, e.g., by RRC signaling, with a beam failure recovery procedure for the UE 502 to use to indicate to the base station 504 that the beam failure has been detected.

The UE transmits a beam failure report 505 to the base station. The beam failure report 505 may include an indication for a failed uplink beam, a potential new beam, a frequency for the communication, and/or a cell ID. The failed beam may be indicated based on an uplink beam index, such as using a spatial relation information (ID) or a transmission configuration indication (TCI) state ID. The UE may use a same component carrier to send the beam failure report 503 as the component carrier that is affected by the beam failure. However, the UE 502 may use a different component carrier than the one that is experiencing the beam failure or experiencing the MPE event. For example, the beam failure may be detected for a mmW component carrier, and the UE 502 may transmit the report 505 of the beam failure to the base station 504 in a sub-6 GHz uplink component carrier.

The base station 504 and UE 502 may communicate over active data/control beams both for DL communication and UL communication. The base station and/or UE may switch to a new beam direction using beam failure recovery procedures. For example, the base station 504 may respond to receipt of the beam failure report 505 by transmitting a response 507 to the UE 502. The response may indicate a new beam for the UE. In another example, the beam failure report from the UE may indicate a replacement beam, and the response from the base station may acknowledge that the base station received the report. At 509, the UE 502 prepares to reset the uplink beam, e.g., to switch to a new uplink beam based on the response from the base station 504. In another example, upon the receipt of the response 507 from the base station 504, the UE 502 may autonomously switch to a potential new beam, which is reported in the beam failure report 505. The preparation may include decoding the base station response 507 and preparing for a new beam configuration in RF circuits of the UE 502. Then, the UE 502 transmits uplink transmission(s) 511 to the base station 504 using the new uplink beam.

In some circumstances, a UE may use a default uplink beam. The UE may use a default uplink beam, e.g., for PUCCH, SRS, and/or PUSCH, when the base station has not configured, or otherwise indicated, spatial relation information or an UL TCI state ID for the corresponding channel. For example, if the UE has not received downlink signaling from the base station that provides a configuration of spatial relation information or an UL TCI state ID for PUCCH, the UE may use a default uplink beam for PUCCH transmissions. When the base station has configured at least one control resource set (CORESET) on a component carrier, the UE may determine the default beam uplink beam by using the uplink beam for receiving the configured CORESET having the lowest ID. When the base station has configured at least one CORESET on a component carrier, the UE may determine the default beam uplink beam to be the reception beam indicated by an active PDSCH TCI state having the lowest ID.

If the default beam experiences a beam failure, e.g., due to MPE or another reason, the base station may be unable to identify the failed beam in a beam failure report 505 from the UE, because the base station has not configured spatial relation information for the reported beam. Aspects presented herein enable a UE to indicate a default beam in a beam failure report to the base station and for the base station to interpret the beam failure report in order to identify the reported beam as a default uplink beam for the UE.

Figure 6:
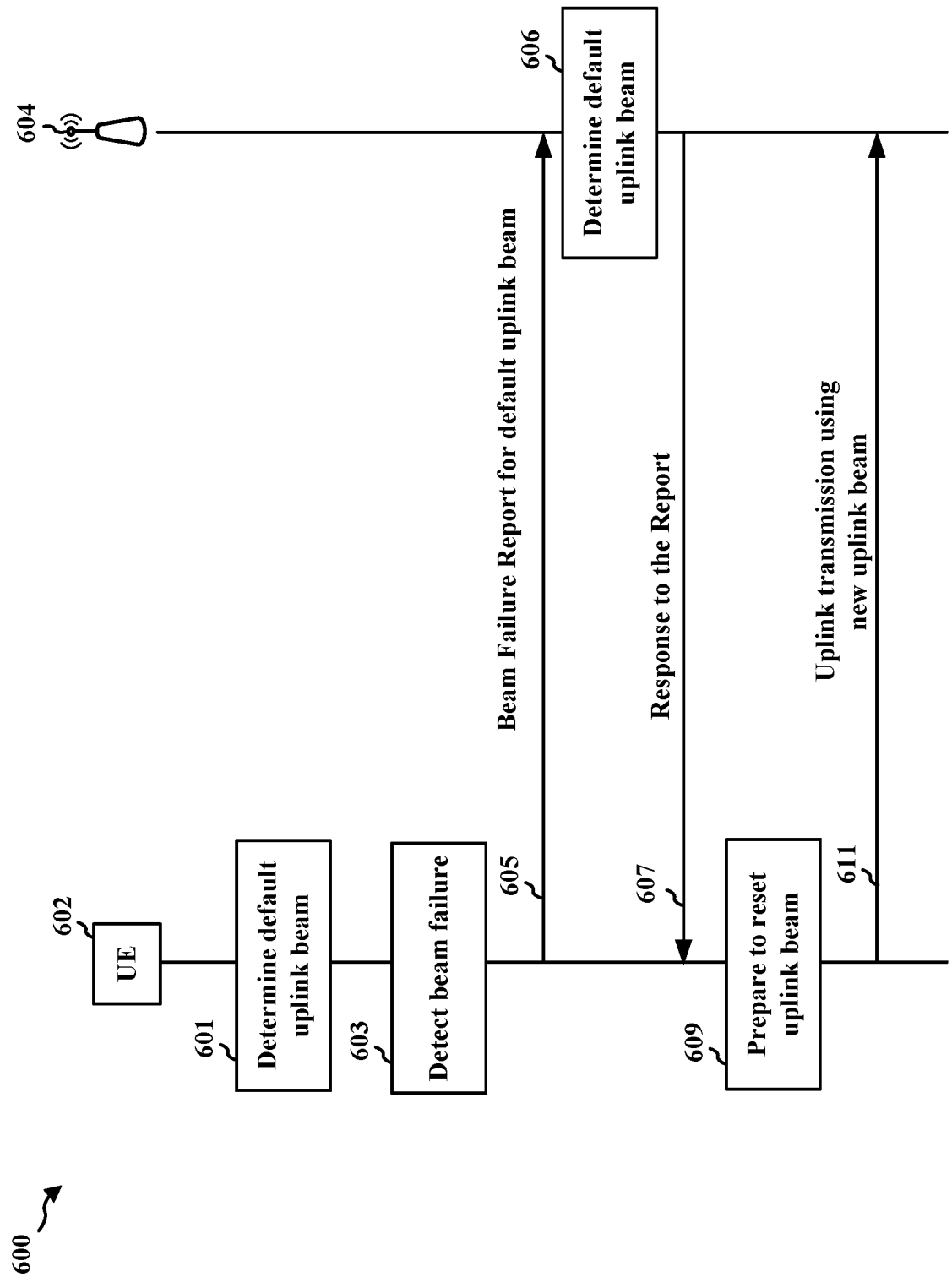
FIG. 6 is an example communication flow between a UE and a base station.

FIG. 6 illustrates an example communication flow 600 between a UE 602 and a base station 604 that includes a beam failure report for a default uplink beam. At 601, the UE 602 determines a default uplink beam for an uplink channel for a component carrier. As noted above, the UE may use a default uplink beam for PUCCH, SRS, and/or PUSCH when the base station has not configured, or otherwise indicated, spatial relation information or an UL TCI state ID for the corresponding channel. When the base station 604 has configured at least one CORESET on a component carrier, the UE 602 may determine the default beam uplink beam, at 601, to be the uplink beam for receiving the configured CORESET having the lowest ID. When the base station 604 has configured at least one CORESET on a component carrier, the UE 602 may determine the default beam uplink beam to be the reception beam indicated by an active PDSCH TCI state having the lowest ID.

At 603, the UE 602 detects a beam failure of the default beam, which triggers the UE 602 to send a beam failure report 605 to the base station 604. The beam failure report indicates to the base station that the failed beam is the default uplink beam. In an example, the beam failure report 605 may indicate the default beam by not including a failed beam ID (not including an ID of a failed beam even if IDs of a new beam or other beams are included in the report). The absence of the failed beam ID may implicitly indicate that the default beam is the beam that has failed and is the beam being reported in the beam failure report. In another example, the uplink beam failure report may include an uplink beam indication ID that indicates the default uplink beam. A reserved UL beam indication ID or entry may be used to indicate that the failed uplink beam is the default uplink beam. For example, the UE may indicate the default uplink beam by using an uplink beam identification ID that is beyond the maximum configured IDs for spatial relation info or UL TCI state.

In another example, the UE may indicate the default uplink beam by using particular pattern of bits, e.g. all 1s, all zeros, etc., in the failed uplink beam indication ID field of the beam failure report. In some examples, the failed uplink beam may be identified in the beam failure report through an uplink beam indication reference signal ID, e.g., a spatial RS ID in spatial relation information or an uplink TCI state. When the base station 604 has configured at least one CORESET for the UE 602 on a component carrier, the failed default uplink beam may be identified in the beam failure report by the quasi co-location (QCL)-TypeD RS ID that the UE 602 used for receiving a CORESET with a lowest ID in the active downlink bandwidth part (BWP). When the base station 604 has not configured at least one CORESET for the UE 602 on a component carrier, the failed default uplink beam may be identified in the beam failure report by the QCL-TypeD RS ID in the active PDSCH TCI state with a lowest ID in the active downlink BWP.

In another example, the UE 602 may indicate the default uplink beam in the beam failure report by including a dedicated bit, a lowest CORESET ID, or a lowest active PDSCH TCI state ID in the beam failure report 605.

At 606, the base station 604 uses the information of the beam failure report 605 to identify the failed beam as the default beam for the UE 602. As discussed in connection with FIG. 5, the base station transmits a response 607 to the beam failure report. The UE prepares to use a new uplink beam, at 609, based on the response 607 and then transmits uplink communication 611 to the base station 604 using the new uplink beam.

Figure 7:
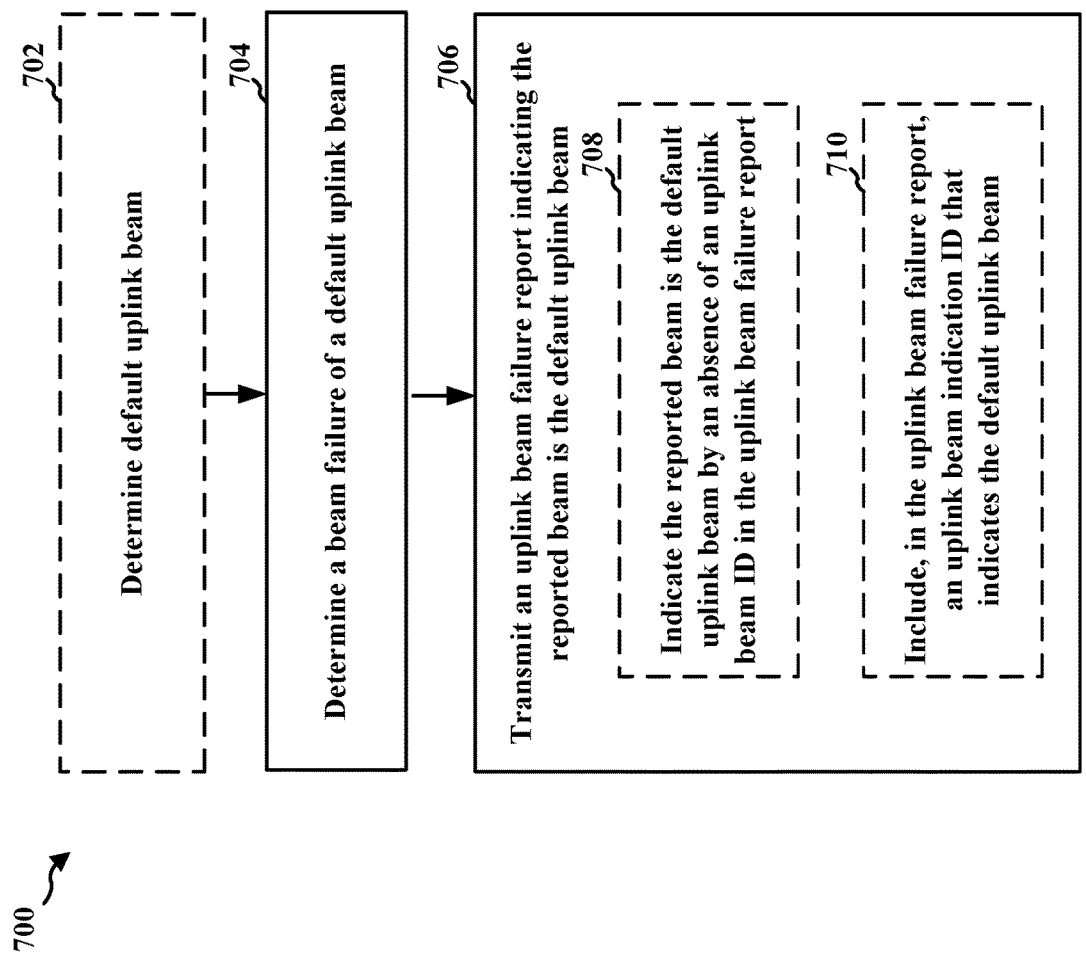
FIG. 7 is a flowchart of a method of wireless communication at a UE.

FIG. 7 is a flowchart of a method 700 of wireless communication. The method may be performed by a UE or a component of a UE (e.g., the UE 104, 350, 502, 602; the apparatus 802; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable a UE to indicate a beam failure for a default uplink beam to a base station.

At 704, the UE determines a beam failure of a default uplink beam for the UE. The determination of the beam failure may be performed, e.g., by the beam failure component 842 of the apparatus 802 in FIG. 8. The UE may detect the beam failure, e.g., as described in connection with 503 in FIGS. 5 and/or 603 in FIG. 6. As illustrated at 702, the UE may determine the default uplink beam for an uplink channel comprising a PUCCH, a SRS, or a PUSCH when spatial relation information or UL TCI state ID is not configured for the uplink channel. The determination of the default uplink beam may be performed, e.g., by the default uplink beam component 840 of the apparatus 802 in FIG. 8. The determination of the default uplink beam may include aspects described in connection with 601 in FIG. 6. When at least one CORESET is configured on a component carrier, the UE determines the default uplink beam based on a beam for receiving a CORESET with a lowest ID. When at least one CORESET is not configured on a component carrier, the UE may determine the default uplink beam based on an active PDSCH TCI state having a lowest ID.

At 706, the UE transmits an uplink beam failure report in response to determining the beam failure of the default uplink beam, the uplink beam failure report indicating that a reported beam is the default uplink beam for the UE. The transmission of the uplink beam failure report may be performed, e.g., by the report component 844 of the apparatus 802 in FIG. 8. The beam failure report may include aspects described in connection with the beam failure report 605 in FIG. 6. The UE may indicate that the reported beam is the default uplink beam by an absence of an uplink beam indication ID in the uplink beam failure report, as illustrated at 708. In another example, the UE may include, in the uplink beam failure report, an uplink beam indication ID that indicates the default uplink beam, as illustrated at 710. The uplink beam indication ID may include an ID reserved for the default uplink beam. The uplink beam indication ID may include an ID other than a configured ID for spatial relation information or an uplink TCI state for the UE. The uplink beam indication ID may include a set of bits, e.g., all 1s, all zeros, etc., corresponding to the default uplink beam.

A failed beam may be identified by an uplink beam indication RS ID. If a CORESET is configured for the UE on a component carrier, the uplink beam indication ID may indicate the default uplink beam based on an RS ID for receiving the CORESET having a lowest ID in an active downlink bandwidth part for the component carrier. Thus, when the UE sends a beam failure report indicating the RS ID for receiving the CORESET having a lowest ID in an active downlink BWP, the base station may determine from the beam failure report that the default uplink beam has experienced a beam failure. If a CORESET is not configured by the base station for the UE on a component carrier, the uplink beam indication ID may indicate the default uplink beam based on an RS ID in an active PDSCH TCI state having a lowest ID in an active downlink BWP for the component carrier.

In another example, the uplink beam indication ID may indicate the default uplink beam based on a dedicated bit, a CORESET having a lowest ID, or a lowest active PDSCH TCI state having a lowest ID.

Figure 8:
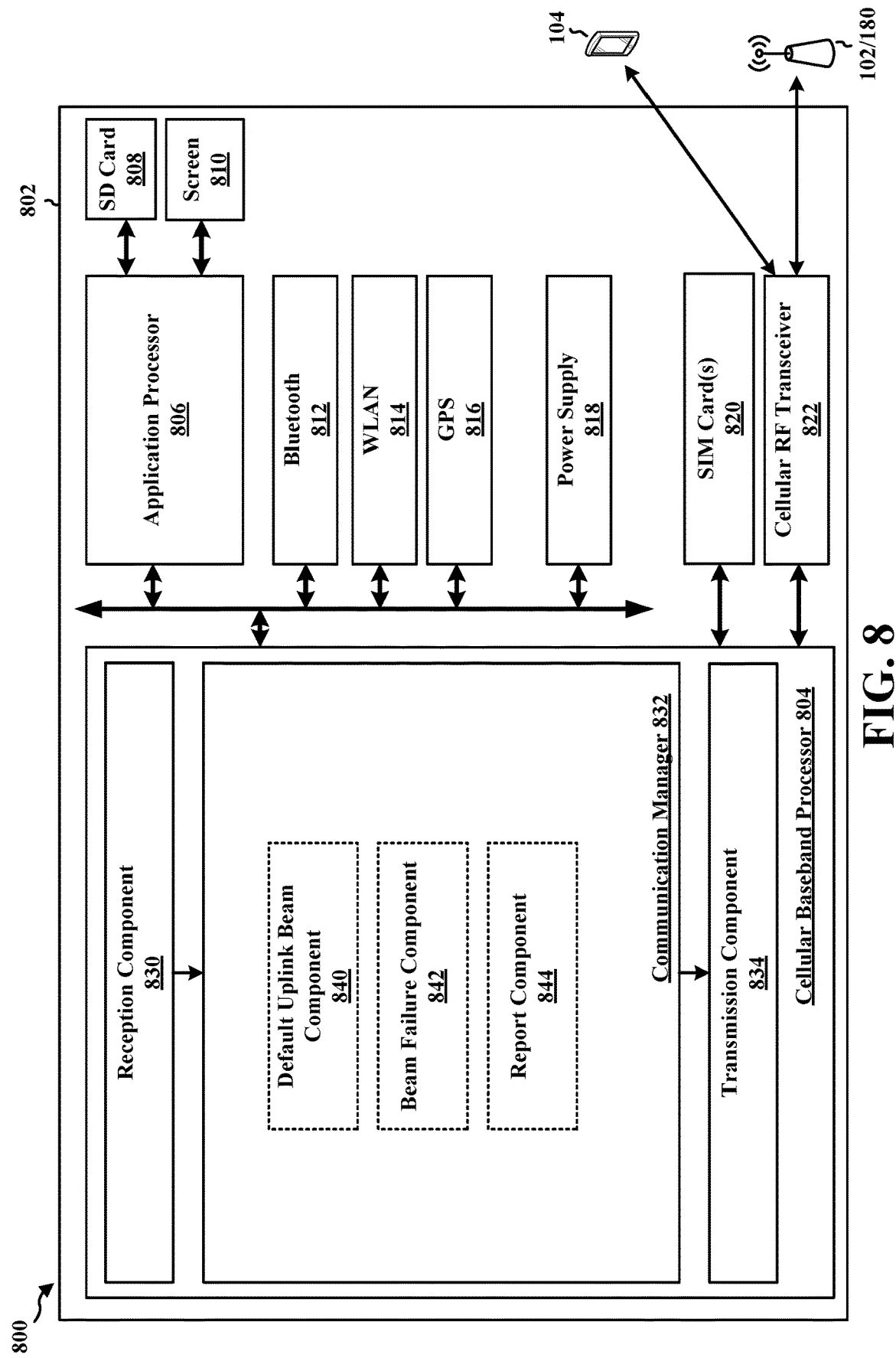
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The communication manager 832 may include a default uplink beam component 840 that is configured to determine a default uplink beam, e.g., as described in connection with 702 in FIG. 7. The communication manager 832 may include a beam failure component 842 that is configured to determine an occurrence of a beam failure of a default uplink beam for the UE, e.g., as described in connection with 704 in FIG. 7. The communication manager 832 may include a report component 844 that is configured to transmit an uplink beam failure report in response to determining the beam failure of the default uplink beam, the uplink beam failure report indicating that a reported beam is the default uplink beam for the UE, e.g., as described in connection with 706 in FIG. 7.

The apparatus 802 may include additional components that perform each of the blocks of the algorithm in the flowchart of FIG. 7 and the aspects performed by the UE 602 in FIG. 6. As such, each block in the aforementioned flowchart of FIG. 7 and aspects performed by the UE 602 in FIG. 6 may be performed by at least one component of a wireless apparatus, each component being one or more hardware components specifically configured to carry out the stated processes/algorithm, implemented by a processor configured to perform the stated processes/algorithm, stored within a computer-readable medium for implementation by a processor, or some combination thereof.

The components may be software components running in a processor, resident/stored in the computer readable medium/memory, one or more hardware components coupled to the processor, or some combination thereof. The processing system may be a component of the UE 350 and may include the memory 360 and/or at least one of the TX processor 368, the RX processor 356, and the controller/processor 359. Alternatively, the processing system may be the entire UE (e.g., see 350 of FIG. 3).

In one configuration, an apparatus 802 for wireless communication may include means for determining an occurrence of a beam failure of a default uplink beam for the UE, e.g., such as described in connection with FIGS. 5 and 6 or 704 in FIG. 7. The apparatus 802 may further include means for transmitting an uplink beam failure report in response to determining the beam failure of the default uplink beam, the uplink beam failure report indicating that a reported beam is the default uplink beam for the UE, e.g., as described in connection with 706 in FIG. 7. The apparatus 802 may further include means for determining the default uplink beam for an uplink channel comprising a PUCCH, an SRS, or a PUSCH when spatial relation information or UL TCI state ID is not configured for the uplink channel, e.g., as described in connection with 702 in FIG. 7. The aforementioned means may be one or more of the aforementioned components of the apparatus and/or the processing system of the apparatus may be configured to perform the functions recited by the aforementioned means. The processing system may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
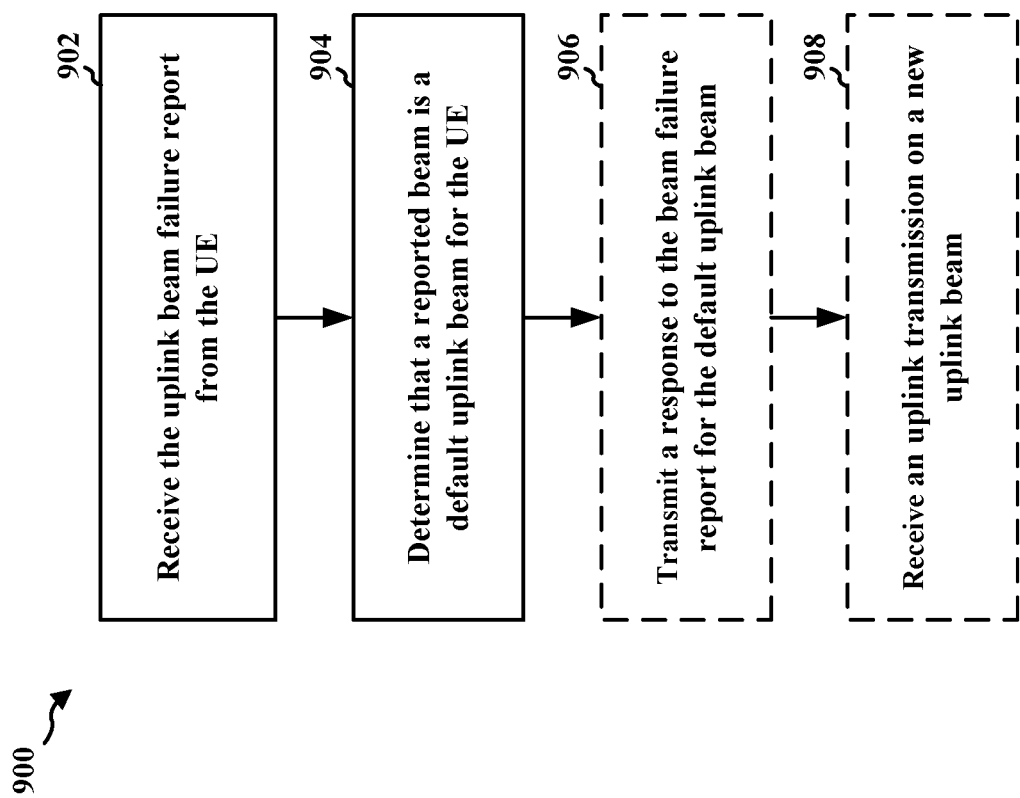
FIG. 9 is a flowchart of a method of wireless communication at a base station.

FIG. 9 is a flowchart of a method 900 of wireless communication. The method may be performed by a base station or a component of a base station (e.g., the base station 102, 180, 310, 504, 604; the apparatus 1002; the processing system, which may include the memory 376 and which may be the entire base station 310 or a component of the base station 310, such as the TX processor 316, the RX processor 370, and/or the controller/processor 375). Optional aspects are illustrated with a dashed line. The method may enable the base station to identify a default beam that is experiencing beam failure.

At 902, the base station receives an uplink beam failure report from a UE. The reception of the beam failure report may be performed, e.g., by the report component 1044 of the apparatus 1002 in FIG. 10. The beam failure report may include aspects described in connection with the beam failure report 505 in FIG. 5 and/or the beam failure report 605 in FIG. 6.

At 904, the base station determines that a reported beam is a default uplink beam for the UE. The determination may be performed, e.g., by the default beam identification component 1040 of the apparatus 1002 in FIG. 10. The determination may include aspects described in connection with 606 in FIG. 6. The default uplink beam may be determined for an uplink channel comprising a PUCCH, a SRS, or a PUSCH when spatial relation information or UL TCI state ID is not configured for the uplink channel. For example, when the base station has configured at least one CORESET on a component carrier for the UE, the default uplink beam may be based on a beam for receiving a CORESET with a lowest ID, and when the base station has not configured a CORESET on a component carrier for the UE, the default uplink beam may be based on an active PDSCH TCI state having a lowest ID.

In some examples, the base station may determine that the reported beam is the default uplink beam based on an absence of an uplink beam indication ID in the uplink beam failure report. In other examples, the uplink beam failure report may include an uplink beam indication ID that indicates the default uplink beam, and the base station may determine that the reported beam is the default uplink beam based on the uplink beam indication ID. The uplink beam indication ID may include an ID reserved for the default uplink beam. The uplink beam indication ID may include an ID other than a configured ID for spatial relation information or an uplink TCI state for the UE. For example, the ID may extend beyond a maximum configured ID for the UE. The uplink beam indication ID may include a set of bits, e.g., all 1s, all zeros, etc., corresponding to the default uplink beam.

The failed beam may be identified by an uplink beam indication RS ID. If a CORESET is configured for the UE on a component carrier, the uplink beam indication ID may indicate the default uplink beam based on an RS ID for receiving the CORESET having a lowest ID in an active downlink bandwidth part for the component carrier. Thus, when the UE sends a beam failure report indicating the RS ID for receiving the CORESET having a lowest ID in an active downlink BWP, the base station may determine from the beam failure report that the default uplink beam has experienced a beam failure. If a CORESET is not configured by the base station for the UE on a component carrier, the uplink beam indication ID may indicate the default uplink beam based on an RS ID in an active PDSCH TCI state having a lowest ID in an active downlink BWP for the component carrier.

In another example, the uplink beam indication ID may indicate the default uplink beam based on a dedicated bit, a CORESET having a lowest ID, or a lowest active PDSCH TCI state having a lowest ID.

After determining that the failed beam is the default uplink beam, the base station may transmit a response to the beam failure report for the default uplink beam, as illustrated at 906, and/or receive an uplink transmission on a new uplink beam in response to determining that the reported beam is the default uplink beam for the UE, as illustrated at 908. The transmission of the response may be performed, e.g., by the beam failure response component 1042 of the apparatus 1002 in FIG. 10. The reception of the uplink transmission on the new uplink beam may be performed, e.g., by the reception component 1030 of the apparatus 1002 in FIG. 10. Examples of transmission of a response and/or receiving uplink transmissions using a new uplink beam are described in connection with FIGS. 5 and 6.

Figure 10:
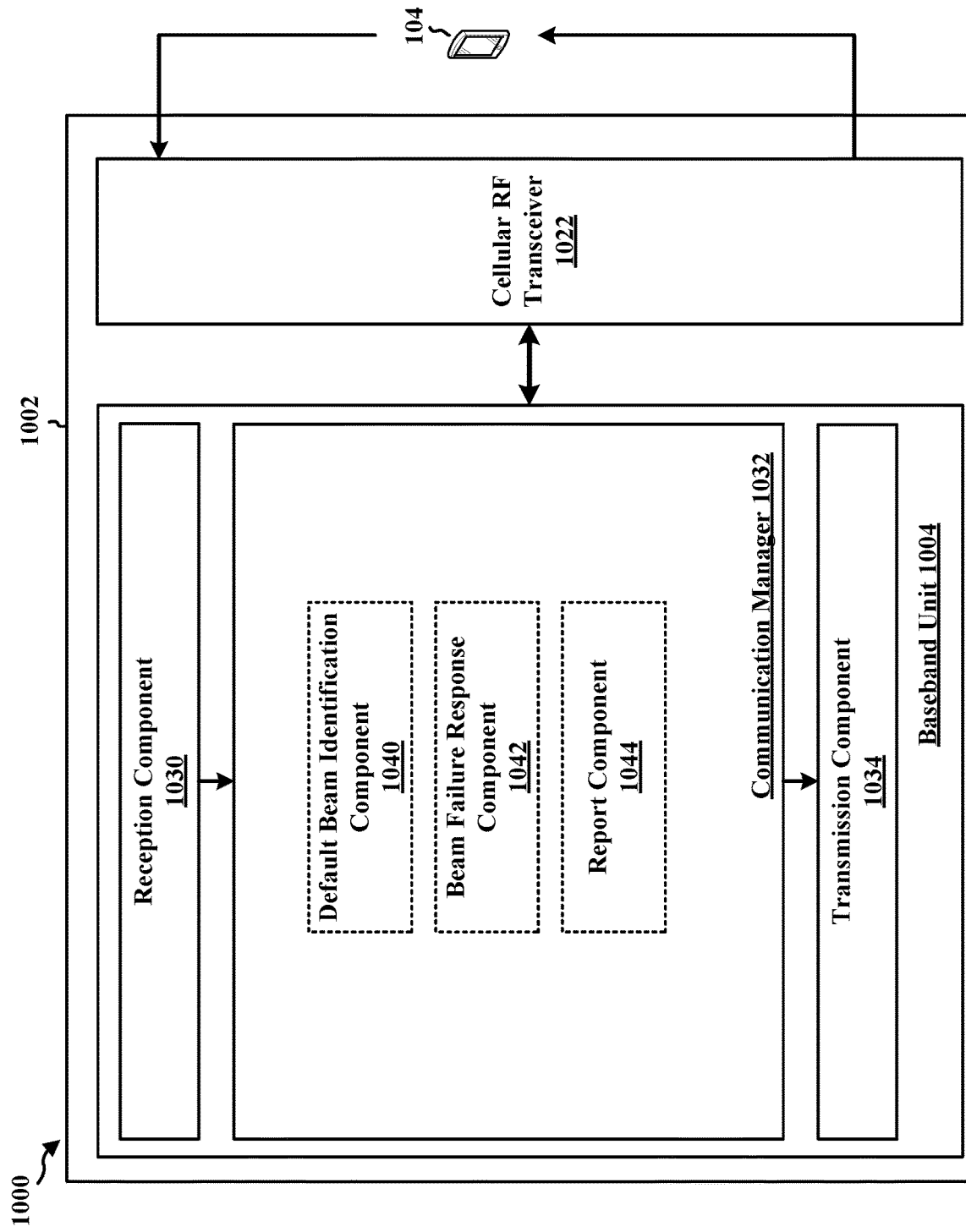
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a default beam identification component 1040 that is configured to receive an uplink beam failure report from a UE, e.g., as described in connection with 904 in FIG. 9. The communication manager 1032 includes a report component 1044 that is configured to determine that a reported beam is a default uplink beam for the UE, e.g., as described in connection with 902 in FIG. 9. The communication manager 1032 may include a beam failure response component 1040 that is configured to transmit a response to the beam failure report for the default uplink beam, e.g., as described in connection with 906 in FIG. 9. The apparatus 1002 may include a reception component 1030 that is configured to receive an uplink transmission on a new uplink beam, e.g., as described in connection with 908 in FIG. 9.

The apparatus 1002 may include additional components that perform each of the blocks of the algorithm in the flowchart of FIG. 9 and the aspects performed by the base station 604 in FIG. 6. As such, each block in the aforementioned flowchart of FIG. 9 and aspects performed by the base station 604 in FIG. 6 may be performed by at least one component of a wireless apparatus, each component being one or more hardware components specifically configured to carry out the stated processes/algorithm, implemented by a processor configured to perform the stated processes/algorithm, stored within a computer-readable medium for implementation by a processor, or some combination thereof.

The components may be software components running in a processor, resident/stored in the computer readable medium/memory, one or more hardware components coupled to the processor, or some combination thereof. The system may be a component of the base station 310 and may include the memory 376 and/or at least one of the TX processor 316, the RX processor 370, and the controller/processor 375. Alternatively, the processing system may be the entire base station (e.g., see 310 of FIG. 3).

In one configuration, an apparatus 1002 for wireless communication includes means for receiving an uplink beam failure report from a UE, e.g., as described in connection with 902 in FIG. 9. The apparatus 1002 may include means for determining that a reported beam is a default uplink beam for the UE, e.g., as described in connection with 904 in FIG. 9. The apparatus 1002 may further include means for transmitting a response to the beam failure report for the default uplink beam, e.g., as described in connection with 906 in FIG. 9. The apparatus 1002 may include means for receiving an uplink transmission on a new uplink beam, e.g., as described in connection with 908 in FIG. 9. The aforementioned means may be one or more of the aforementioned components of the apparatus 1002 and/or the processing system of the apparatus 1002 configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and may be combined with aspects of other examples or teaching described herein, without limitation.

Aspect 1 is a method of wireless communication at a UE, comprising: determining a beam failure of a default uplink beam for the UE; and transmitting an uplink beam failure report in response to determining the beam failure of the default uplink beam, the uplink beam failure report indicating that a reported beam is the default uplink beam for the UE.

In Aspect 2, the method of aspect 1 further includes indicating that the default uplink beam by an absence of an uplink beam indication ID in the uplink beam failure report.

In Aspect 3, the method of aspect 1 further includes including, in the uplink beam failure report, an uplink beam indication ID that indicates the default uplink beam.

In Aspect 4, the method of any of aspect 1 or aspect 3 further includes that the uplink beam indication ID comprises an ID reserved for the default uplink beam.

In Aspect 5, the method of any of aspects 1 and 3-4 further includes that the uplink beam indication ID comprises an ID other than a configured ID for spatial relation information or an uplink TCI state for the UE.

In Aspect 6, the method of any of aspects 1 and 3-5 further includes that the uplink beam indication ID comprises a set of bits corresponding to the default uplink beam.

In Aspect 7, the method of any of aspects 1 and 3-6 further includes that a failed beam is identified by an uplink beam indication RS ID, wherein a CORESET is configured for the UE on a component carrier, and wherein the uplink beam indication ID indicates the default uplink beam based on an RS ID for receiving the CORESET having a lowest ID in an active downlink bandwidth part for the component carrier.

In Aspect 8, the method of any of aspects 1 and 3-7 further includes that a failed beam is identified by an uplink beam indication RS ID, wherein a CORESET is not configured for the UE on a component carrier, and wherein the uplink beam indication ID indicates the default uplink beam based on an RS ID in an active PDSCH TCI state having a lowest ID in an active downlink bandwidth part for the component carrier.

In Aspect 9, the method of any of aspects 1 and 3-8 further includes that the uplink beam indication ID indicates the default uplink beam based on a CORESET having a lowest ID.

In Aspect 10, the method of any of aspects 1 and 3-9 further includes that the uplink beam indication ID indicates the default uplink beam based on an active PDSCH TCI state having a lowest ID.

In Aspect 11, the method of any of aspects 1-10 further includes determining the default uplink beam for an uplink channel comprising a PUCCH, a SRS, or a PUSCH when spatial relation information or UL TCI state ID is not configured for the uplink channel.

In Aspect 12, the method of any of aspects 1-11 further includes that when at least one CORESET is configured on a component carrier, the UE determines the default uplink beam based on a beam for receiving a CORESET with a lowest ID, and when at least one CORESET is not configured on a component carrier, the UE determines the default uplink beam based on an active PDSCH TCI state having a lowest ID.

Aspect 13 is a device including one or more processors and one or more memories in electronic communication with the one or more processors storing instructions executable by the one or more processors to cause the device to implement a method as in any of aspects 1-12.

Aspect 14 is a system or apparatus including means for implementing a method or realizing an apparatus as in any of aspects 1-12.

Aspect 15 is a non-transitory computer readable medium storing instructions executable by one or more processors to cause the one or more processors to implement a method as in any of aspects 1-12.

Aspect 16 is a method of wireless communication at a base station, comprising: receiving an uplink beam failure report from a UE; and determining that a reported beam is a default uplink beam for the UE.

In Aspect 17, the method of aspect 16 further includes that the base station determines that the reported beam is the default uplink beam based on an absence of an uplink beam indication ID in the uplink beam failure report.

In Aspect 18, the method of aspect 16 further includes that the uplink beam failure report includes an uplink beam indication ID that indicates the default uplink beam, and wherein the base station determines that the reported beam is the default uplink beam based on the uplink beam indication ID.

In Aspect 19, the method of aspects 16 or Example 18 further includes that the uplink beam indication ID comprises an ID reserved for the default uplink beam.

In Aspect 20, the method of any of aspects 16 and 18-19 further includes that the uplink beam indication ID comprises an ID other than a configured ID for spatial relation information or an uplink TCI state for the UE.

In Aspect 21, the method of any of aspects 16 and 18-20 further includes that the uplink beam indication ID comprises a set of bits corresponding to the default uplink beam.

In Aspect 22, the method of any of aspects 16 and 18-21 further includes that a failed beam is identified by an uplink beam indication RS ID, wherein a CORESET is configured for the UE on a component carrier, and wherein the uplink beam indication ID indicates the default uplink beam based on an RS ID for receiving the CORESET having a lowest ID in an active downlink bandwidth part for the component carrier.

In Aspect 23, the method of any of aspects 16 and 18-22 further includes that a failed beam is identified by an uplink beam indication RS ID, wherein a CORESET is not configured for the UE on a component carrier, and wherein the uplink beam indication ID indicates the default uplink beam based on an RS ID in an active PDSCH TCI state having a lowest ID in an active downlink bandwidth part for the component carrier.

In Aspect 24, the method of any of aspects 16 and 18-23 further includes that the uplink beam indication ID indicates the default uplink beam based on a CORESET having a lowest ID.

In Aspect 25, the method of any of aspects 16 and 18-24 further includes that the uplink beam indication ID indicates the default uplink beam based on an active PDSCH TCI state having a lowest ID.

In Aspect 26, the method of any of aspects 16-25 further includes transmitting a response to the beam failure report for the default uplink beam; or receiving an uplink transmission on a new uplink beam in response to determining that the reported beam is the default uplink beam for the UE.

Aspect 27 is a device including one or more processors and one or more memories in electronic communication with the one or more processors storing instructions executable by the one or more processors to cause the device to implement a method as in any of aspects 16-26.

Aspect 28 is a system or apparatus including means for implementing a method or realizing an apparatus as in any of aspects 16-26.

Aspect 29 is a non-transitory computer readable medium storing instructions executable by one or more processors to cause the one or more processors to implement a method as in any of aspects 16-26.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    determining an uplink beam failure at the UE of a default uplink beam without a configured spatial relation, wherein determining the uplink beam failure comprises determining based on a maximum permissible exposure (MPE) level; and
    transmitting an uplink beam failure report in response to determining the uplink beam failure of the default uplink beam, the uplink beam failure report indicating that a reported beam is the default uplink beam for the UE.

2. The method of claim 1, further comprising:
    indicating that the reported beam is the default uplink beam by an absence of an uplink beam indication identifier (ID) in the uplink beam failure report.

3. The method of claim 1, further comprising:
    including, in the uplink beam failure report, an uplink beam indication identifier (ID) that indicates the default uplink beam.

4. The method of claim 3, wherein the uplink beam indication ID comprises an ID reserved for the default uplink beam.

5. The method of claim 3, wherein the uplink beam indication ID comprises an ID other than a configured ID for spatial relation information or an uplink transmission configuration indication (TCI) state for the UE.

6. The method of claim 3, wherein the uplink beam indication ID comprises a set of bits corresponding to the default uplink beam.

7. The method of claim 3, wherein a failed beam is identified by an uplink beam indication reference signal (RS) ID, wherein a control resource set (CORESET) is configured for the UE on a component carrier, and wherein the uplink beam indication ID indicates the default uplink beam based on an RS ID for receiving the CORESET having a lowest ID in an active downlink bandwidth part for the component carrier.

8. The method of claim 3, wherein a failed beam is identified by an uplink beam indication reference signal (RS) ID, wherein a control resource set (CORESET) is not configured for the UE on a component carrier, and wherein the uplink beam indication ID indicates the default uplink beam based on an RS ID in an active physical downlink shared channel (PDSCH) transmission configuration indication (TCI) state having a lowest ID in an active downlink bandwidth part for the component carrier.

9. The method of claim 3, wherein the uplink beam indication ID indicates the default uplink beam based on a control resource set (CORESET) having a lowest ID.

10. The method of claim 3, wherein the uplink beam indication ID indicates the default uplink beam based on an active physical downlink shared channel (PDSCH) transmission configuration indication (TCI) state having a lowest ID.

11. The method of claim 1, further comprising:
    determining the default uplink beam for an uplink channel comprising a physical uplink control channel (PUCCH), a sounding reference signal (SRS), or a physical uplink shared channel (PUSCH) when spatial relation information or UL TCI state ID is not configured for the uplink channel.

12. The method of claim 11, wherein when at least one control resource set (CORESET) is configured on a component carrier, the UE determines the default uplink beam based on a beam for receiving a CORESET with a lowest ID, and
    when at least one CORESET is not configured on the component carrier, the UE determines the default uplink beam based on an active physical downlink shared channel (PDSCH) transmission configuration indication (TCI) state having the lowest ID.

13. The method of claim 1, wherein determining the uplink beam failure based on the MPE level comprises:
    reducing a transmission power to meet an MPE limit;
    determining an uplink reference signal received power (RSRP) for a signal received at a network entity based on the transmission power and a pathloss; and determining the uplink beam failure based on the uplink RSRP being below a threshold.

14. An apparatus for wireless communication at a user equipment (UE), comprising:
   a memory; and
   at least one processor coupled to the memory and configured to:
      determine an uplink beam failure at the UE of a default uplink beam without a configured spatial relation, wherein determining the uplink beam failure comprises determining based on a maximum permissible exposure (MPE) level; and
      transmit an uplink beam failure report in response to determining the uplink beam failure of the default uplink beam, the uplink beam failure report indicating that a reported beam is the default uplink beam for the UE.

15. The apparatus of claim 14, wherein the at least one processor is configured to indicate that the reported beam is the default uplink beam by an absence of an uplink beam indication identifier (ID) in the uplink beam failure report.

16. The apparatus of claim 14, wherein the at least one processor is configured to include, in the uplink beam failure report, an uplink beam indication identifier (ID) that indicates the default uplink beam.

17. The apparatus of claim 16, wherein the uplink beam indication ID comprises an ID reserved for the default uplink beam.

18. The apparatus of claim 16, wherein the uplink beam indication ID comprises an ID other than a configured ID for spatial relation information or an uplink transmission configuration indication (TCI) state for the UE.

19. The apparatus of claim 16, wherein the uplink beam indication ID comprises a set of bits corresponding to the default uplink beam.

20. The apparatus of claim 16, wherein a failed beam is identified by an uplink beam indication reference signal (RS) ID, wherein a control resource set (CORESET) is configured for the UE on a component carrier, and wherein the uplink beam indication ID indicates the default uplink beam based on an RS ID for receiving the CORESET having a lowest ID in an active downlink bandwidth part for the component carrier.

21. The apparatus of claim 16, wherein a failed beam is identified by an uplink beam indication reference signal (RS) ID, wherein a control resource set (CORESET) is not configured for the UE on a component carrier, and wherein the uplink beam indication ID indicates the default uplink beam based on an RS ID in an active physical downlink shared channel (PDSCH) transmission configuration indication (TCI) state having a lowest ID in an active downlink bandwidth part for the component carrier.

22. The apparatus of claim 16, wherein the uplink beam indication ID indicates the default uplink beam based on a control resource set (CORESET) having a lowest ID.

23. The apparatus of claim 16, wherein the uplink beam indication ID indicates the default uplink beam based on an active physical downlink shared channel (PDSCH) transmission configuration indication (TCI) state having a lowest ID.

24. The apparatus of claim 14, wherein the at least one processor is further configured to:
   determine the default uplink beam for an uplink channel comprising a physical uplink control channel (PUCCH), a sounding reference signal (SRS), or a physical uplink shared channel (PUSCH) when spatial relation information or UL TCI state ID is not configured for the uplink channel.

25. The apparatus of claim 24, wherein when at least one control resource set (CORESET) is configured on a component carrier, the at least one processor is configured to determine the default uplink beam based on a beam for receiving a CORESET with a lowest ID, and
   when at least one CORESET is not configured on the component carrier, the at least one processor is configured to determine the default uplink beam based on an active physical downlink shared channel (PDSCH) transmission configuration indication (TCI) state having the lowest ID.

26. The apparatus of claim 14, wherein the at least one processor is configured to determine the uplink beam failure based on the MPE level by:
   reducing a transmission power to meet an MPE limit;
   determining an uplink reference signal received power (RSRP) for a signal received at a network entity based on the transmission power and a pathloss; and
   determining the uplink beam failure based on the uplink RSRP being below a threshold.

* * * * *